(12) United States Patent
Shi et al.

(10) Patent No.: US 11,911,975 B2
(45) Date of Patent: Feb. 27, 2024

(54) CARBON FIBER REINFORCED PLASTIC ELECTROFUSION FITTING AND A SELF-MONITORING METHOD OF STRAIN

(71) Applicant: ZHEJIANG UNIVERSITY, Hangzhou (CN)

(72) Inventors: Jianfeng Shi, Hangzhou (CN); Riwu Yao, Hangzhou (CN); Jinyang Zheng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 1027 days.

(21) Appl. No.: 16/449,269

(22) Filed: Jun. 21, 2019

(65) Prior Publication Data

US 2020/0276771 A1    Sep. 3, 2020

(30) Foreign Application Priority Data

Feb. 28, 2019   (CN) .......................... 201910147997.6

(51) Int. Cl.

| | |
|---|---|
| *F16L 47/03* | (2006.01) |
| *B29C 45/00* | (2006.01) |
| *B29C 65/00* | (2006.01) |
| *B29C 65/34* | (2006.01) |
| *B29C 65/82* | (2006.01) |
| *B29K 23/00* | (2006.01) |
| *B29K 507/04* | (2006.01) |
| *B29L 23/00* | (2006.01) |

(52) U.S. Cl.
CPC ...... *B29C 65/8276* (2013.01); *B29C 45/0001* (2013.01); *B29C 65/342* (2013.01); *B29C 66/5221* (2013.01); *F16L 47/03* (2013.01); *B29K 2023/065* (2013.01); *B29K 2507/04* (2013.01); *B29L 2023/22* (2013.01)

(58) Field of Classification Search
CPC ... F16L 47/03; B29C 65/8276; B29C 66/5221
See application file for complete search history.

(56) References Cited

U.S. PATENT DOCUMENTS

| | | | |
|---|---|---|---|
| 2015/0210823 A1* | 7/2015 | Uliel ................. | B29C 66/73921 285/21.2 |
| 2016/0273687 A1* | 9/2016 | Rubinski .................. | G01L 5/24 |

* cited by examiner

*Primary Examiner* — Daniel McNally
(74) *Attorney, Agent, or Firm* — Li & Cai Intellectual Property (USA) Office

(57) ABSTRACT

The invention provides a carbon fiber reinforced plastic electrofusion fitting and a self-monitoring method of strain for the fitting. Carbon fiber filled polymer is used to fabricate the fitting to improve the mechanical strength of the fitting. The fitting comprises an electrofusion fitting body embedded with a resistance heating wire and two terminals arranged on the electrofusion fitting body and connected to the two ends of the resistance heating wire respectively. For the self-monitoring of strain, at least one pair of electrodes are set on the surface of the electrofusion fitting. The resistance change between electrodes caused by fitting deformation due to temperature change or mechanical loading during operation can be measured, and could be further used for structural health monitoring of the electrofusion fitting. The combination of mechanical enhancement and strain sensing of the electrofusion fitting can improve the performance and reliability of plastic pipelines.

9 Claims, 6 Drawing Sheets

CARBON FIBER REINFORCED PLASTIC ELECTROFUSION FITTING AND A SELF-MONITORING METHOD OF STRAIN

BACKGROUND

1. Technical Field

This invention relates to thermoplastic electrofusion fittings, and more specifically to the reinforced plastic electrofusion fittings made of carbon fiber filled thermoplastic with self-monitoring function of strain.

2. Description of Related Art

Compared to traditional metallic pipes, plastics such as polyethylene and polypropylene and their composite pipes have the advantages of high flexibility, good toughness, corrosion resistance and long service life. They are also recognized as "green" pipes. With the upgrade of international energy structure and the acceleration of urbanization, plastics and their composite pipes have been widely used in major projects. For example, they are used as high-pressure bridging pipelines in tidal flat and shallow-sea oil industries; as gas transmission pipeline in urban natural gas pipeline networks and as cooling water circulation pipeline in nuclear power plants. They are also ideal substitutes for oil well water injection pipes, shallow-sea medium and low pressure marine hoses.

Among the connection technologies for plastic pipes, the welding technology of electrofusion fitting is a commonly used method due to its advantages, including convenient on-site installation, high operation standardization and reliable performance. The working principle of electrofusion fitting is that the outer wall of the pipe will be melted and connected with the inner wall of electrofusion fitting, and the melting pressure is also generated when the melting thermoplastics expands. Electrofusion fitting is also the most important means for connecting reinforced plastic composite pipes. With the introduction of steel wire and fiber tape reinforced layers, the pressure bearing capacities of some large diameter plastic composite pipes have exceeded 6.4 MPa, and the strength of electrofusion fitting has become the main bottleneck restricting the development of high-pressure composite pipeline. According to the analysis of the causes of pipeline system failure by US Plastic Pipe Database Committee (PPDC), over 50% of polyethylene gas piping failures occurred at joints or fittings. The strength and reliability of electrofusion fitting has become bottleneck in the entire plastic and composite pipeline.

At present, there are two main ways to reinforce electrofusion fittings: built-in steel plate reinforcement layer and wound fiber reinforcement layers around the outer wall of the electrofusion fitting. For fitting with built-in steel plate reinforcement layer, since the steel is a polar material, and the plastic substrates such as polyethylene and polypropylene are mostly non-polar materials, the bonding quality between the two materials is poor, resulting in the inability to coordinately carry the load, and reducing the reinforcing effect of the built-in steel plate. The method of winding fiber reinforced layer around the outer wall of the electrofusion fitting can only increase the circumferential strength, but the axial strength is not obviously improved.

To improve the reliability of electrofusion fittings, many research institutes are bidding to study various in-service non-destructive safety assessment techniques, such as ultrasonic inspection methods for cold-welding defects of electrofusion fitting in polyethylene pipes (Invention Patent No: ZL200810121786.7), welding quality inspection and automatic evaluation method of electrofusion fitting (Invention Patent No: ZL201010270038.2), automatic identification method for defect type of polyethylene electrofusion fitting based on ultrasonic phased array detection (Invention Patent No: ZL201510666070.5), a microwave transmission detecting device for polyethylene pipe welded joint (Invention Patent No: ZL201320070119.7), etc. These inspection methods have continuously improved the safety of electrofusion fitting, and formed technical standards on non-destructive testing and safety assessment standards for polyethylene pipe electrofusion fittings (GB/T29460, GB/T29461). However, these detection methods cannot monitor the safety state of the electrofusion fittings in real time during operation, and the reliability of the electrofusion fitting cannot be evaluated promptly.

Structural health monitoring technologies can detect and prevent potential failures in pipelines promptly. Optical fiber sensing technology is a commonly used pipeline monitoring method, and has been applied in bridges and other projects. However, the signal caused by temperature and strain are difficult to decouple in optical fiber sensing. Also, the optical fiber is vulnerable to external force, and requires special protection, which limits its application.

In terms of the mechanical enhancement of electrofusion fittings, polymer filled with carbon fiber has been widely studied to improve the mechanical strength of the polymer matrix. Manufacturing the electrofusion fitting with carbon fiber reinforced polymer composite is a promising method for improving the mechanical strength of electrofusion fittings. Chukov of National University of Science and Technology in Russia found that the yield strength of short carbon fiber reinforced polyethylene was almost two times higher than that of the unfilled polyethylene. Li at East China Jiaotong University found that the tensile strength and elastic modulus of the composite increased by 18.4% and 208.0% when the carbon fiber fraction was 4.0%. Although the mechanical properties of carbon fiber reinforced polymers have been studied, the feasibility of carbon fiber reinforced polymer for mechanical reinforcement of electrofusion fittings with self-monitoring function of strain was not reported.

SUMMARY

The present invention aims to solve the shortcomings of existing electrofusion fittings in its mechanical strength and safety monitoring, by providing a carbon fiber reinforced plastic electrofusion fitting and a self-monitoring method of strain.

To solve the above technical problems, the solutions adopted by the present invention are as follows:

A carbon fiber reinforced plastic electrofusion fitting with self-monitoring function of strain is provided, which comprises an electrofusion fitting body embedded with a resistance heating wire. Two terminal pins are arranged on the electrofusion fitting body and they are connected to the two ends of the resistance heating wire respectively. The electrofusion fitting body is made of a thermoplastic filled with carbon fiber. At least one pair of electrodes is set on the surface of the electrofusion fitting to monitor the resistance change caused by fitting deformation due to temperature change or mechanical loading during operation to achieve the self-monitoring function of strain.

In the invention, the weight fraction of carbon fiber is 5~20% for the reinforced plastic of the electrofusion fitting.

The specific weight fraction of filled carbon fiber should be determined according to the requirements of the mechanical reinforcement and strain monitoring sensitivity of the reinforced composite.

In the invention, the surface electrodes mentioned above can be sheet electrodes, wire electrodes or strip electrodes, herein the sheet electrodes have a thickness of 0.1~0.5 mm and are set on the surface of the electrofusion fitting by bonding.

In the invention, the surface electrodes can be set circumferentially along the electrofusion fitting to monitor the axial strain of the fitting, or can be set along the axial direction of the electrofusion fitting to monitor the circumferential strain of the fitting. Also, the surface electrodes can be set at an angle of less than 45° to the circumferential or axial direction of the electrofusion fitting, to monitor the circumferential and axial strain of the fitting.

In the invention, when there are at least two pairs of electrodes, the surface electrodes should not contact with each other, since contact of different electrodes would cause current disturbance and affect the measurement results.

In the invention, the distance between the two electrodes in each pair of electrodes is 1~5 mm.

Further, the invention provides a manufacturing method of the aforementioned carbon fiber reinforced plastic electrofusion fitting, comprising the following steps:

(1) The thermoplastic powder and short-cut carbon fiber are stirred with a mechanical stirrer, and a uniform mixture is obtained. The weight fraction of carbon fiber in the mixture is 5~20%. The carbon fiber has a diameter of 7~10 μm and a length of 1~5 mm; the thermoplastic powder refers to a polyethylene powder or a polypropylene powder.

(2) The thermoplastic powder and carbon fiber mixture is added into the hopper of an extruder, and the carbon fiber is evenly distributed in the plastic matrix by the screw shearing action of the extruder. Short carbon fiber reinforced plastic composite is extruded, and then granulated by a granulator to obtain composite particles.

(3) The semi-finished electrofusion fitting is injection molded with the composite particles according to conventional electrofusion fitting injection process.

(4) At least one pair of electrodes is set on the surface of the semi-finished electrofusion fitting: a layer of conductive silver glue is coated on the surface where electrodes are to be set, and then the electrodes are set on the conductive silver glue; or, electrode grooves are designed and manufactured on the surface of the semi-finished electrofusion fitting during injection molding, and then the wire electrodes or the strip electrodes are embedded in the electrode grooves; finally, a carbon fiber reinforced plastic electrofusion fitting with self-monitoring function of strain is obtained.

The invention further provides a self-monitoring method of strain for the aforementioned carbon fiber reinforced plastic electrofusion fitting, which comprises the following steps: connecting each pair of electrodes to a resistance measurement system, measuring and recording the deformation-induced resistance changes when welding the electrofusion fitting or when the fitting is under loading.

The invention also provides another carbon fiber reinforced plastic electrofusion fitting with self-monitoring function of strain, which comprises an electrofusion fitting body embedded with a resistance heating wire. Two terminal pins are arranged on the electrofusion fitting body and they are connected to the two ends of the resistance heating wire respectively. The electrofusion fitting body is made of a thermoplastic filled with carbon fiber; the weight fraction of carbon fiber is 5~20% for the reinforced plastic of electrofusion fitting.

The invention further provides a self-monitoring method of strain for the electrofusion fitting, comprising the following steps:

(1) At least one pair of electrodes are set on the surface of the electrofusion fitting body:

The surface where electrodes are to be set is polished off with sandpaper, and a layer of silver glue is coated on the polished surface. Electrodes with a thickness of 0.1~0.5 mm are set on the surface with the silver glue to reduce contact resistance. Or, electrode grooves are designed and manufactured on the surface of the electrofusion fitting during injection molding, and then the wire electrodes or the strip electrodes are embedded in the electrode grooves.

(2) Connecting each pair of electrodes to a resistance measurement system, measuring and recording the deformation-induced resistance changes when welding the electrofusion fitting or when the fitting is under loading.

In the invention, surface electrodes are set on the fitting surface where the strain is to be monitored, and a resistance measurement system is used to measure and record the resistance change of each pair of electrodes induced by the deformation of the electrofusion fitting. Therefore, it is possible to obtain the strain where electrodes are set and the internal pressure of the fitting based on the measured resistance. One or multiple pairs of electrodes can be employed, and the electrodes can be set in any desired position to monitor the strain of the electrofusion fitting.

Short-cut carbon fiber is used to fill the polymer matrix, and the electrofusion fitting manufactured with the reinforced polymer has improved mechanical strength. Carbon fiber has high elastic modulus and yield strength, the evenly distributed carbon fiber can bear the load transferred by the polymer matrix, thus increasing the mechanical strength of the fitting. The conductive fiber will form a conductive network through the mutual contact when its weight fraction reaches the critical threshold value, and make this composite electrically conductive. For fitting used in plastic pipelines, the internal pressure will cause the strain of fitting material, and result in the loss of carbon fiber contact. This will decrease the conductivity of the composite and increase the resistance between the electrodes. Based on such principle, we can achieve self-monitoring of strain for the electrofusion fitting with the measurement of resistance.

The mechanical strength of the reinforced composite increases firstly and then decreases with the increase of carbon fiber fraction. For strain monitoring, the composite reaches its maximum sensitivity at the critical threshold value of carbon fiber fraction. However, for plastics such as polyethylene and polypropylene, the optimum filling fraction for mechanical reinforcement and strain monitoring is not always the same. Therefore, to manufacture carbon fiber reinforced plastic electrofusion fittings with self-monitoring function of strain, it is necessary to study and adjust the parameters from the aspects of material processing, fiber surface treatment, fiber length-diameter ratio and so on. In this invention, polyethylene composite with different carbon fiber fraction are prepared. The optimum carbon fiber fraction for mechanical reinforcement and strain monitoring is determined by tensile testing, electrical resistivity testing and strain monitoring testing. The final carbon fiber fraction for manufacturing electrofusion fitting is determined by balancing both mechanical reinforcement and strain monitoring sensitivity.

Based on the improved electrical conductivity, surface electrodes are set on the fitting surface, and the strain where electrodes are set and the internal pressure of the fitting can be monitored by measuring resistance. This strain monitoring method can monitor the strain at any desired position only by arranging two electrodes on the surface of the electrofusion fitting, without additional sensors or equipment. It can realize the self-monitoring of strain for electrofusion fittings in operation and improve the safety of electrofusion fittings.

Compared with the existing electrofusion fittings, the benefits of the invention are as follows:

(1) In this invention, carbon fiber is utilized to fill the thermoplastic, which can improve the elastic modulus and yield strength of the composite. The electrofusion fitting made of the composite material has higher mechanical strength, higher blasting pressure, which can improve the operation pressure of plastic and composite pipelines such as polyethylene and polypropylene.

(2) The addition of carbon fiber improves the conductivity of the reinforced composite. By measuring the resistance between the electrodes set on the surface of the electrofusion fitting, the strain of the fitting and its internal pressure can be monitored. This strain monitoring method can monitor the strain at any desired position only by arranging two electrodes on the surface of the electrofusion fitting, without additional sensors or equipment. It can realize the self-monitoring of strain for the reinforced electrofusion fitting in operation and improve the safety of the electrofusion fitting.

(3) The electrofusion fitting in the invention are integrated molded by injection molding without additional steel plate or fiber reinforced layers. This method has the advantages of simple manufacturing process, high stability and low process cost, which overcomes the shortcomings of the traditional steel plate reinforced and fiber reinforced electrofusion fittings.

Attached items: 1 plastic or composite pipe, 2 electrofusion fitting body, 3 resistance heating wire, 4 terminal pins, 5 electrodes.

Figure 1:
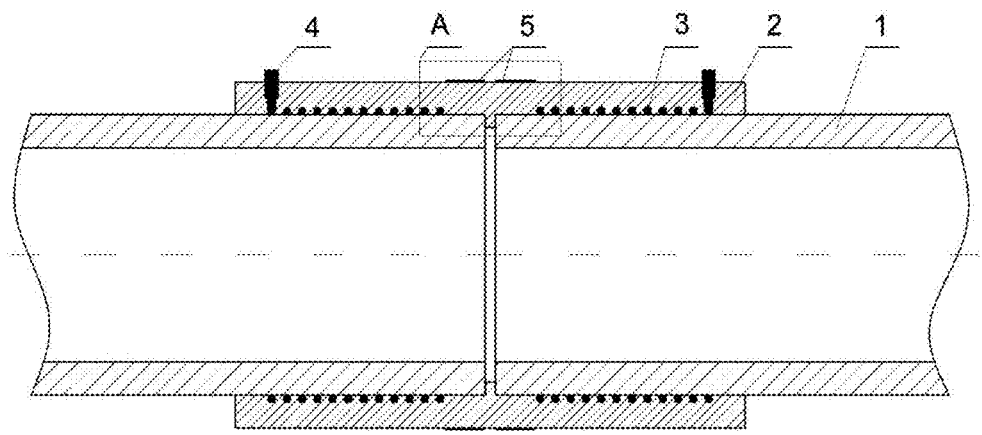
FIG. 1 is a schematic diagram of the structure of the electrofusion fitting provided in the invention.
Figure 2:
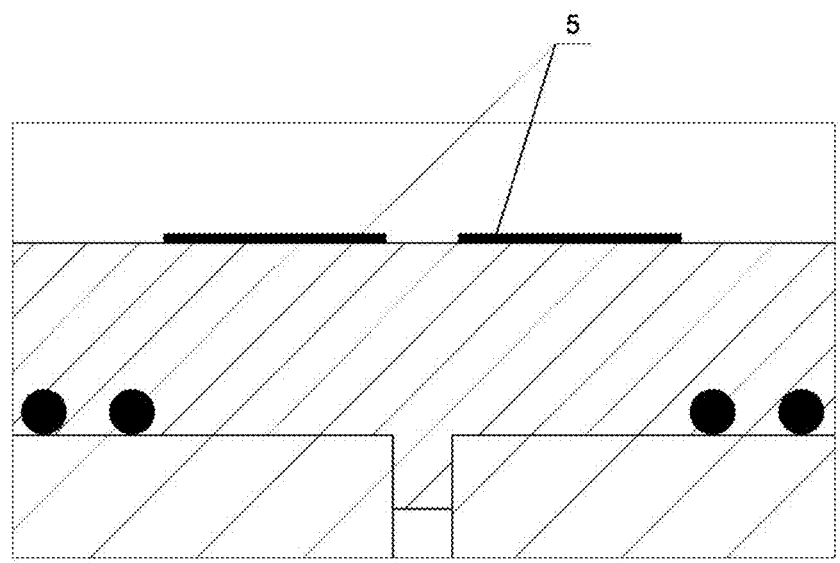

FIG. 2 is a partial enlargement of the part A in FIG. 1, which is a schematic diagram of the electrode set on the surface of the electrofusion fitting.

Figure 3:
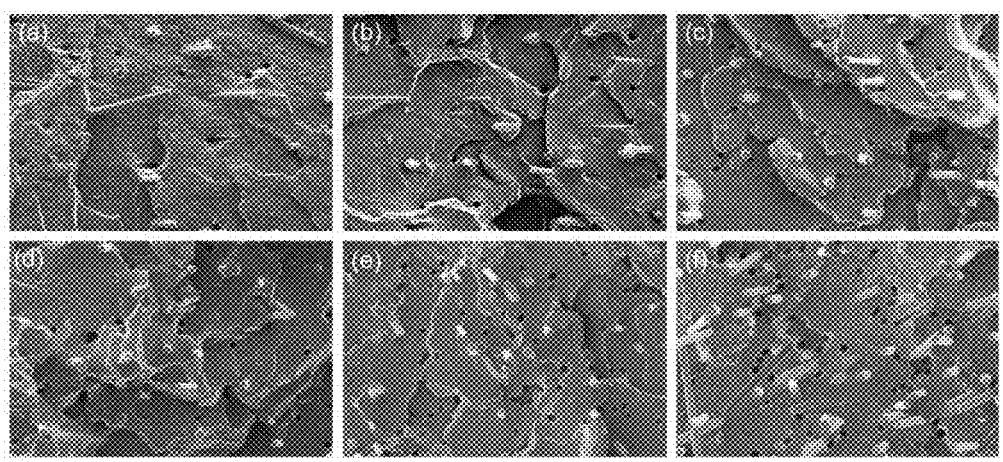

FIG. 3 shows the distribution of carbon fiber (CF) in high density polyethylene (HDPE) matrix observed by scanning electron microscopy in the embodiments of the invention, wherein (a), (b), (c), (d), (e), (f) correspond to 4 wt %, 8 wt %, 10 wt %, 12 wt %, 15 wt % and 20 wt % CF fraction respectively.

Figure 4:
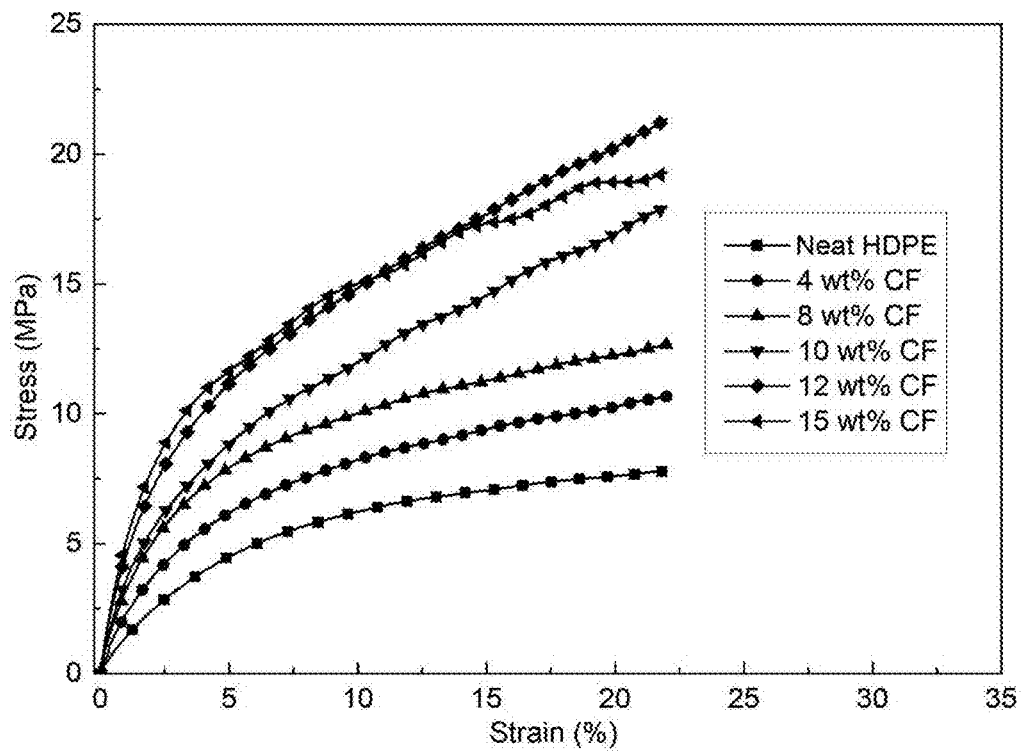

FIG. 4 shows the stress-strain curves of CF reinforced high density polyethylene (HDPE-CF) with different CF fraction in the embodiments of the invention.

Figure 5:
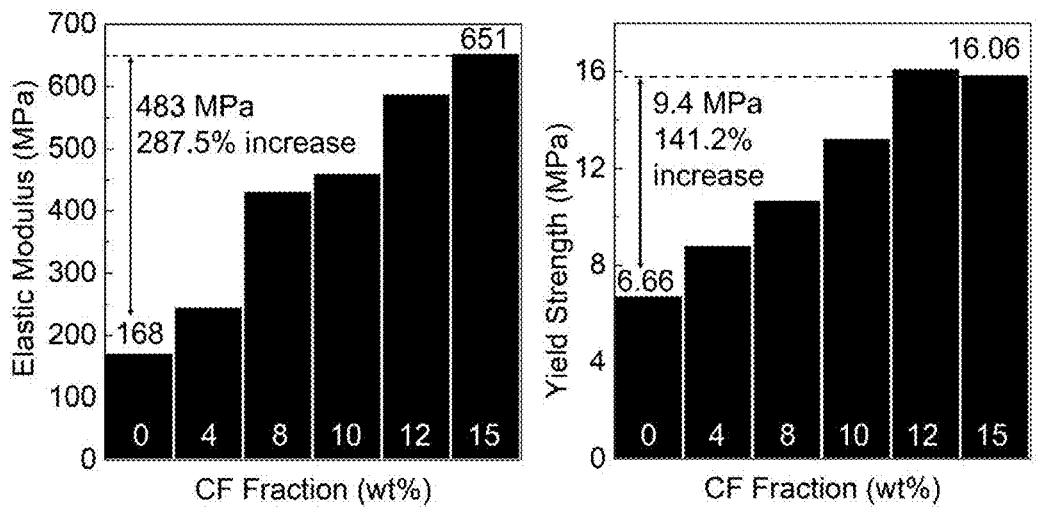

FIG. 5 shows the relationship between elastic modulus (left figure) and yield strength (right figure) of the HDPE-CF with different CF fraction in the embodiments of the invention.

Figure 6:
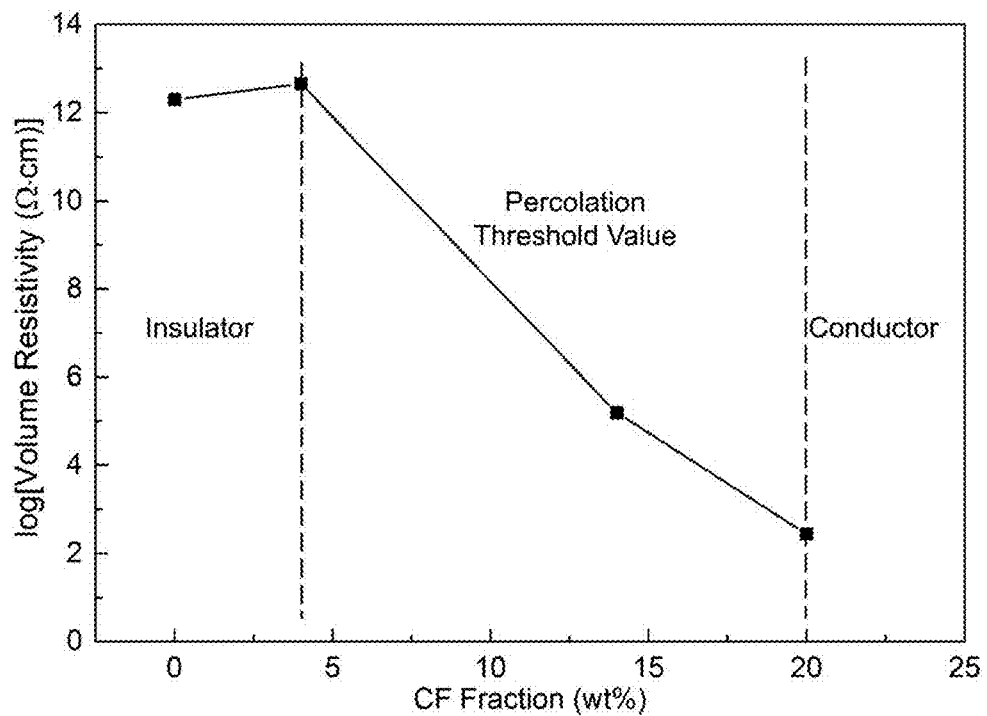

FIG. 6 shows the relationship between the volume resistivity of the HDPE-CF composite and CF fraction in the embodiments of the invention.

Figure 7:
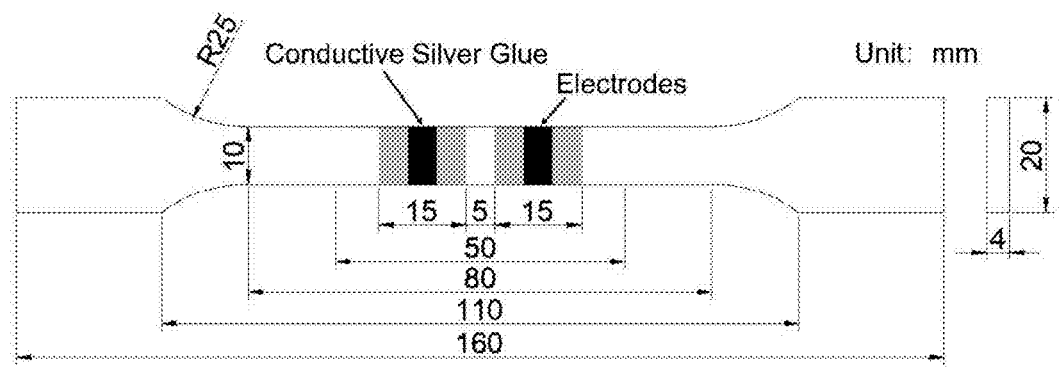

FIG. 7 is a schematic diagram of the size of the tensile specimen and the position and size of the electrodes in the embodiments of the invention.

Figure 8:
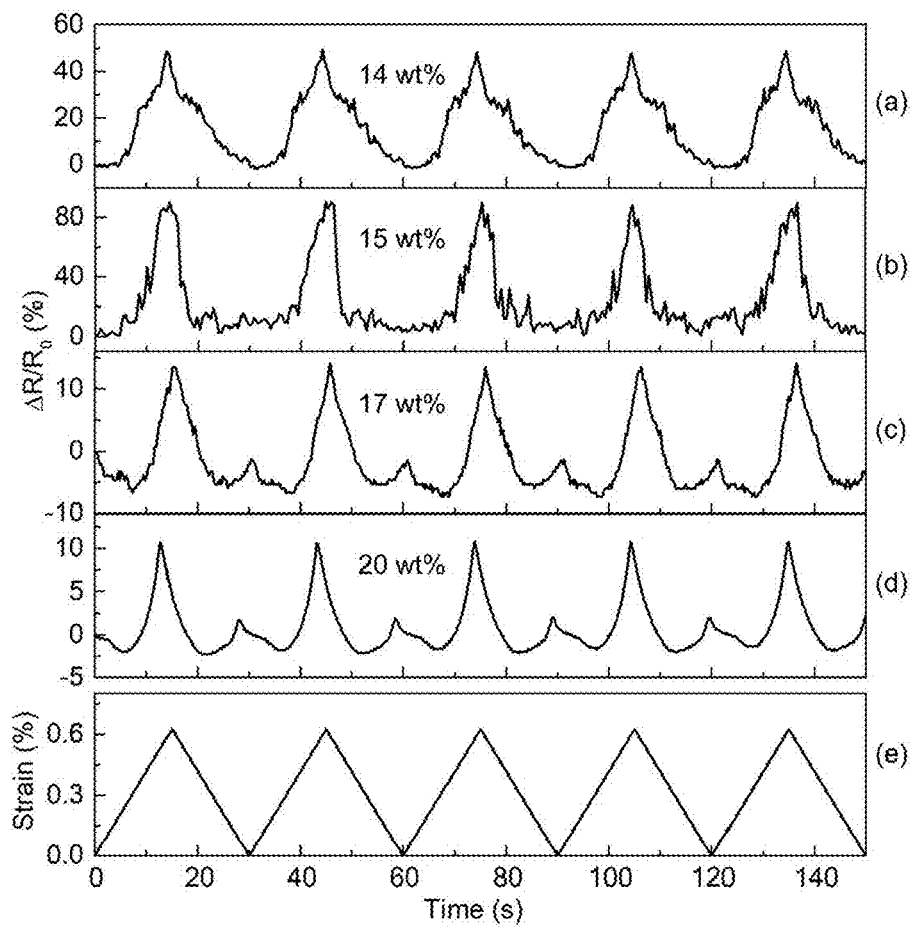

FIG. 8 is the relative resistance changes of HDPE-CF composite with 14 wt %, 15 wt %, 17 wt % and 20 wt % CF fractions under cyclic loading in the embodiments, wherein (e) is the cyclic loading curve controlled by strain.

Figure 9:
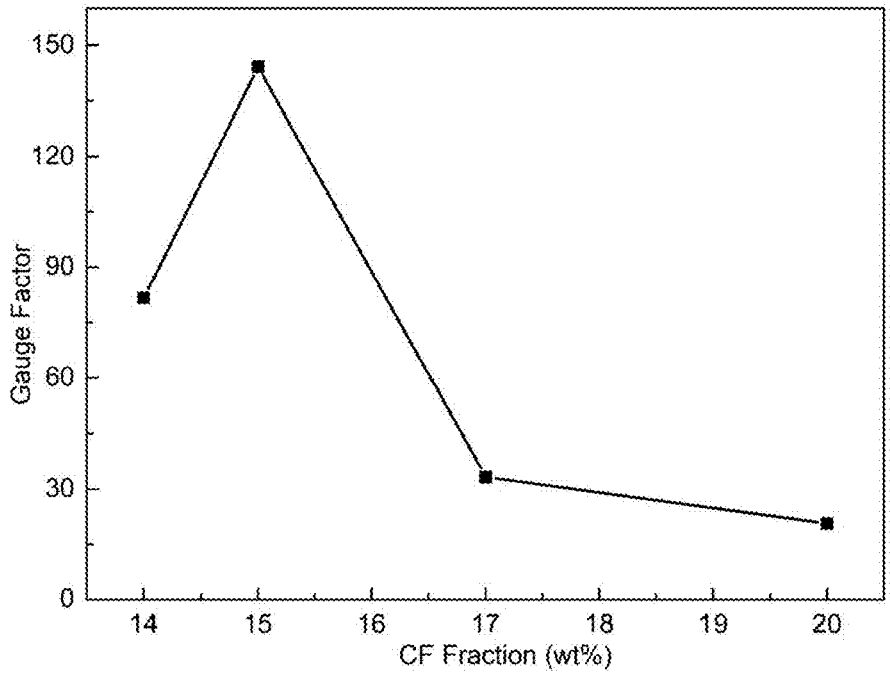

FIG. 9 shows the strain monitoring sensitivity of the HDPE-CF composite with different CF fraction in the embodiments of the invention.

Figure 10:
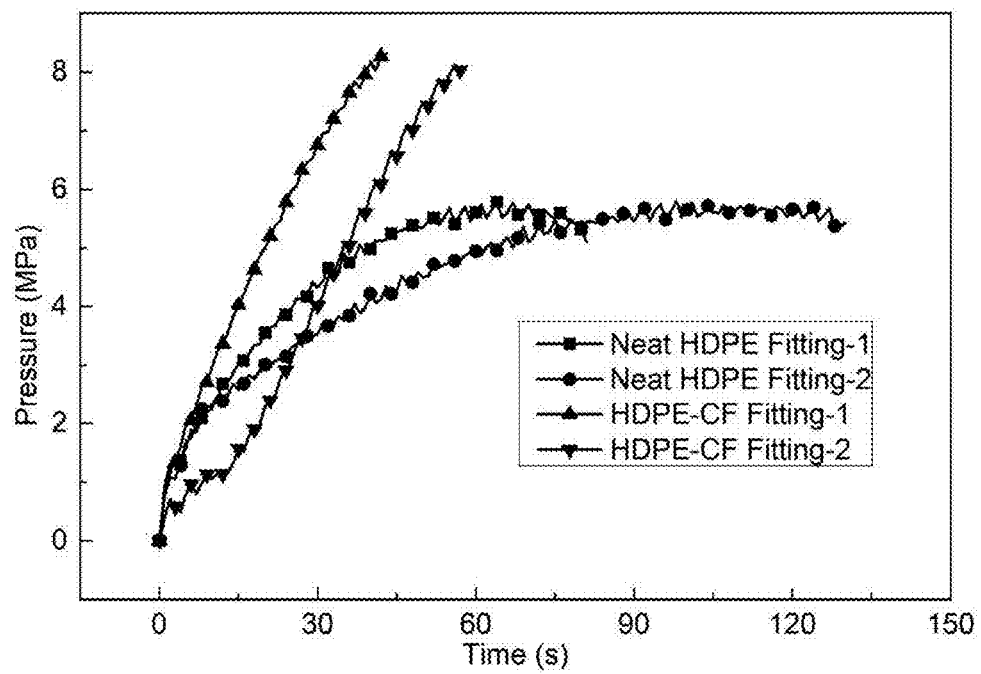

FIG. 10 is the pressure curve of the HDPE-CF and neat HDPE electrofusion fittings during burst tests in the embodiments of the invention.

Figure 11:
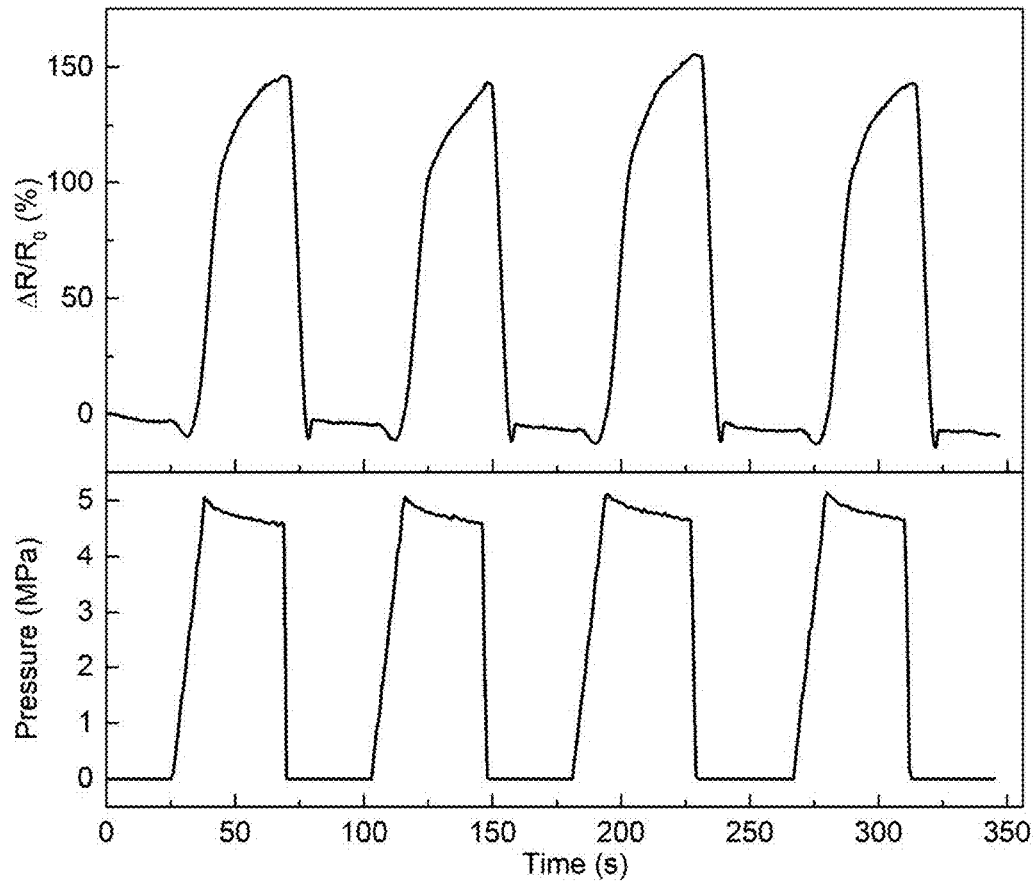

FIG. 11 is the relative resistance change of the HDPE-CF electrofusion fitting under cyclic internal pressure loading in the embodiments of the invention.

Figure 12:
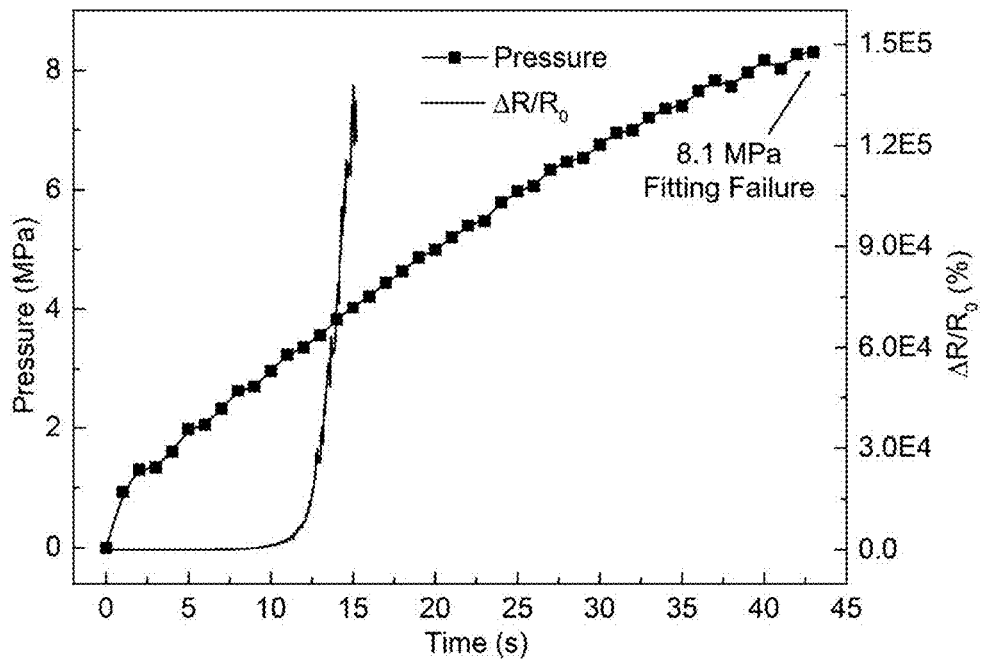

FIG. 12 shows the relative resistance change and internal pressure of the electrofusion fitting verse time during the burst test in the embodiments of the invention.

Figure 13:
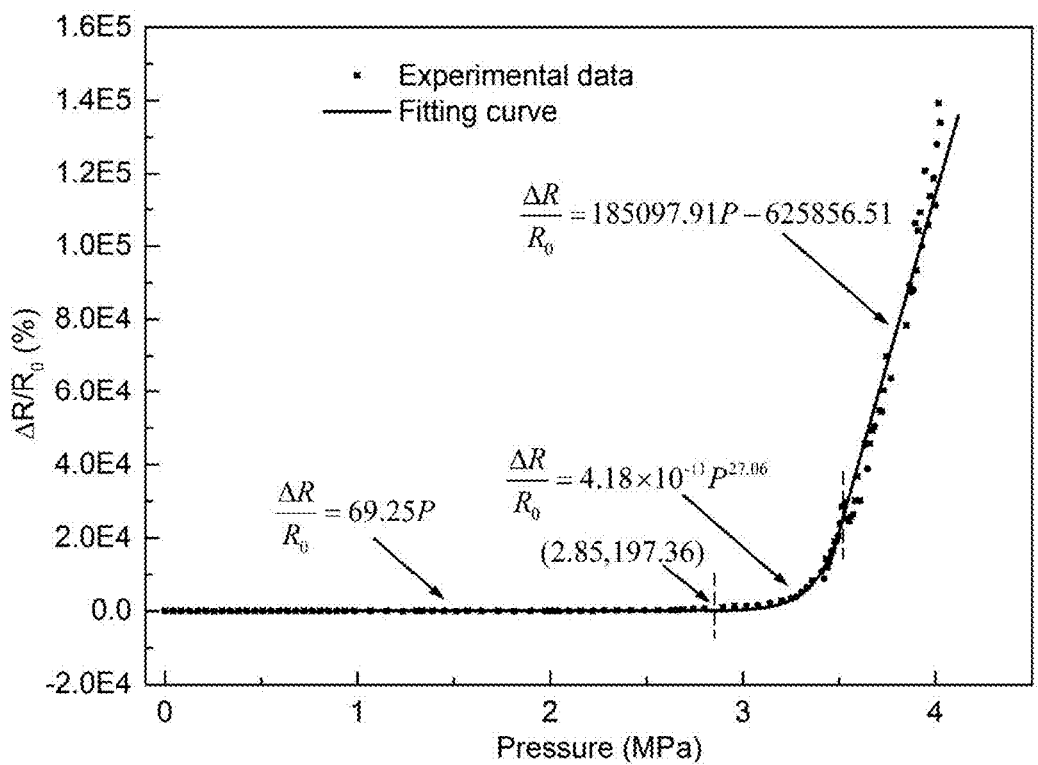

FIG. 13 is the relative resistance change curve with internal pressure of the HDPE-CF electrofusion fitting in the burst test in the embodiments of the invention. The curve is fitted in segments, and the critical point of irreversible failure of the electrofusion fitting under internal pressure is determined according to the intersection point of the two lines in high and low pressure stage.

DESCRIPTION OF THE EXEMPLARY EMBODIMENTS

As shown in FIG. 1 and FIG. 2, the embodiments provide a carbon fiber reinforced plastic electrofusion fitting with self-monitoring function of strain, which comprises an electrofusion fitting body 2 embedded with a resistance heating wire 3. Two terminal pins 4 are arranged on the electrofusion fitting body and they are connected to the two ends of the resistance heating wire respectively. The electrofusion fitting body 2 is made of a thermoplastic filled with CF; electrodes 5 are set on the surface of the electrofusion fitting body to monitor the resistance change caused by fitting deformation due to temperature change or mechanical loading during operation to achieve self-monitoring of strain for the electrofusion fitting. The weight fraction of CF is 5~20% for the reinforced plastic of electrofusion fitting body 2. The specific weight fraction of filled carbon fiber should be determined according to the requirements of the mechanical reinforcement and strain monitoring sensitivity of the reinforced composite.

The electrodes 5 in FIG. 2 are copper foils with a thickness of 0.1~0.5 mm, and the electrodes are set on the surface of the electrofusion fitting. Alternatives are feasible, such as manufacturing electrode grooves on the surface of the electrofusion fitting body 2 during injection molding and embedding the wire electrodes or the strip electrodes in the electrode grooves. The distance between the two electrodes in each pair of electrodes is 1~5 mm. The surface electrodes can be set circumferentially along the electrofusion fitting to monitor the axial strain of the fitting, or can be set along the axial direction of the electrofusion fitting to monitor the circumferential strain of the fitting. Also, the surface electrodes can be set at an angle of less than 45° to the circumferential or axial direction of the electrofusion fitting, to monitor the circumferential and axial strain of the fitting. Multiple pairs of electrodes can be adopted, but the surface electrodes should not contact with each other. Contact of electrodes would cause current disturbance and affect the measurement results.

The CF reinforced plastic electrofusion fitting is manufactured as in the following steps:
(1) The thermoplastic powder and short-cut CF are stirred with a mechanical stirrer, and a uniform mixture is obtained. The weight fraction of CF of the mixture is 5~20%. The CF has a diameter of 7~10 μm and a length of 1~5 mm; the thermoplastic powder refers to a polyethylene or polypropylene powder.
(2) The thermoplastic powder and CF mixture is added into the hopper of the extruder, and the carbon fiber is evenly distributed in the plastic matrix by the screw shearing action of the extruder. Short carbon fiber reinforced plastic composite is extruded, and then granulated by a granulator to obtain composite particles.
(3) The semi-finished electrofusion fitting is injection molded with the composite particles according to the conventional electrofusion fitting injection process.
(4) At least one pair of electrodes is set on the surface of the semi-finished electrofusion fitting, and a carbon fiber reinforced plastic electrofusion fitting with self-monitoring function of strain is obtained.

The way to arrange the electrodes varies depending on the type of electrode: for sheet electrodes, a layer of conductive silver glue is coated on the surface where electrodes are to be set, and then the sheet electrodes are set on the conductive silver glue; for wire or strip electrodes, electrode grooves are designed and manufactured on the surface of the semi-finished electrofusion fitting during injection molding, and then the wire electrodes or the strip electrodes are embedded in the electrode grooves.

The embodiments provide a self-monitoring method of strain for the aforementioned carbon fiber reinforced plastic electrofusion fitting, which comprises: connecting each pair of electrodes to a resistance measurement system, measuring and recoding the resistance changes for strain monitoring when weld the electrofusion fitting or when the fitting is under loading.

Moreover, the invention provides another carbon fiber reinforced plastic electrofusion fitting with self-monitoring function of strain, which comprises an electrofusion fitting body 2 embedded with a resistance heating wire 3. Two terminal pins 4 are arranged on the electrofusion fitting body and they are connected to the two ends of the resistance heating wire respectively. The electrofusion fitting body 2 is made of a thermoplastic filled with CF, and the weight fraction of CF is 5~20%. Compared with the previous embodiment, this electrofusion fitting does not arrange electrodes before use, which allows the user to arrange the electrode pairs on the desired position by themselves.

Therefore, the self-monitoring method of strain for this carbon fiber reinforced plastic electrofusion fitting comprises the following steps:
(1) At least one pair of electrodes is set on the surface of the semi-finished electrofusion fitting.

The surface where electrodes are to be set is polished off with sandpaper, and a layer of silver glue is coated on the polished surface. Electrodes with a thickness of 0.1~0.5 mm are set on the surface with the silver glue to reduce contact resistance. Or, electrode grooves are designed and manufactured on the surface of the electrofusion fitting during injection molding, and then the wire electrodes or the strip electrodes are embedded in the electrode grooves.

(2) Connecting each pair of electrodes to a resistance measurement system, measuring and recoding the resistance changes for strain monitoring when welding the electrofusion fitting or when the fitting is under loading.

The embodiments of the invention are further described in the following with reference to the accompanying drawings. The following embodiments are only used to offer a more clear illustration of the technical features of the invention, and are not intended to limit the scope of the invention. All raw materials and their components in the embodiments can be obtained through open market.

In this embodiment, the filling fraction of CF is determined first. Tensile specimens of the HDPE-CF composite with 4 wt %, 8 wt %, 10 wt %, 12 wt %, 15 wt % and 20 wt % CF fractions are manufactured respectively. The manufacturing method comprises the following steps:
(1) The corresponding amounts of HDPE powder and short-cut CF are weighed. The HDPE powder and CF are stirred with a mechanical stirrer for 3 minutes at a stirring speed of 3000 rpm, and the uniform mixture A is obtained.
(2) The mixture A is added into the extruder, and short carbon fiber reinforced plastic composite B is extruded at a extrusion temperature of 200° C. and a crew speed of 50 rpm.
(3) The short composite B is granulated by granulator to obtain composite particles C.
(4) The composite particles C is then injected into the tensile specimens by injection molding machine. The temperatures of the injection molding machine are set as 180° C., 185° C., 190° C., 195° C. and 200° C. for the 1~4 section and the outlet. The injection molding pressure is set as 185 MPa.

For comparison, neat HDPE tensile specimens are manufactured with the same HDPE powder. The manufacturing process of the final electrofusion fitting in the embodiment is the same as the above steps, except that the injection molds in step (4) are different.

Scanning electron microscope is used to observe the impact fracture surfaces of the HDPE-CF composite to understand the distribution and dispersion of the CF particles in the HDPE matrix. FIG. 3 shows the uniform distribution of CF in the HDPE matrix. Mechanical properties of HDPE-CF composite with varying CF fraction are measured through tensile testing, and the stress-strain curves are illustrated in FIG. 4. The elastic modulus and yield strength of HDPE-CF composite with different CF fraction are presented in FIG. 5. The results reveal that the addition of CF can significantly increase the elastic modulus and yield strength of HDPE-CF. For elastic modulus, the composite reaches the maximum value of 651 MPa at 15 wt % CF fraction, which is 287.5% higher than the neat HDPE. For tensile yield strength, the maximum value is 16.06 MPa at 12 wt % CF fraction, which is 141.2% higher than the neat HDPE. The yield strength begins to decline slightly at 15 wt %. Thus, for mechanical enhancement, the appropriate CF fraction is 12~15 wt %.

To determine the optimum CF fraction for strain monitoring, insulation resistance tester is used to measure the volume resistance of the HDPE-CF composite with different CF fraction, as shown in FIG. 6. The results reveal that the percolation threshold value of the CF reinforced composite is around 5~20 wt %.

To further determine the optimum CF fraction for strain monitoring, four CF fractions of 14, 15, 17 and 20 wt % are chosen and their resistance responses under cyclic loading are tested. A pair of electrodes is attached on the composite to measure the resistance. The electrodes are set with the following steps:

I: The surface where electrodes are to be set is polished off with sandpaper;

II: A layer of silver glue is coated on the polished surface;

III: Electrodes with a thickness of 0.1~0.5 mm are pasted on the polished surface with the silver glue.

The size and position of the attached electrodes are demonstrated in FIG. 7. The experimental equipment for strain monitoring under cyclic loading is built in the common way in this field. The tensile specimen with attached electrodes is clamped in the fixture of a universal testing machine, and the electrodes on the surface of the tensile specimen are connected to a resistance measurement system. The cyclic tensile displacement and the corresponding resistance changes are recorded in the experiment. FIG. 8 presents the strain and resistance response of HDPE-CF composite versus time under cyclic tensile loading. FIG. 8 (e) is the cyclic strain, and FIG. 8 (a), (b), (c), (d) are the resistance responses of HDPE-CF composites with 14, 15, 17 and 20 wt % CF fractions, respectively.

We can see that the electrical resistance values follow closely the strain trend of tensile specimen, and both reach the maximum value at the same time. We can obtain the gauge factor for strain monitoring of composite with different CF fraction by dividing the maximum relative resistance change by the maximum strain:

$$G = \frac{(\Delta R/R_0)_{max}}{S_{max}} \quad (1)$$

Where G is the gauge factor for strain monitoring (1); $\Delta R$ is the absolute change of resistance value ($\Omega$); $R_0$ is the initial resistance value ($\Omega$); S is the strain of specimen (%).

FIG. 9 summarizes the gauge factors of different CF fraction, and the HDPE-CF composite with 15% CF fraction exhibits a highest gauge factor of 144.2. Thus, for strain monitoring, the optimum CF fraction is 15 wt %.

Based on the mechanical and electrical testing, for mechanical enhancement, the CF fraction is 12~15 wt %; for strain monitoring, the optimum CF fraction is 15 wt %. Hence, 15 wt % CF fraction is chosen to manufacture the electrofusion fitting.

In this embodiment, the carbon fiber reinforced plastic electrofusion fitting with self-monitoring function of strain is manufactured as the following steps:

(1) Carbon fiber reinforced polymer composite for manufacturing electrofusion fitting are composed of 17 parts of HDPE powder and 3 parts of short-cut CF. The weighed HDPE powder and short-cut CF are stirred with a mechanical stirrer for 3 minutes at a stirring speed of 3000 rpm, and the uniform mixture A is obtained.

(2) The mixture A is added into the extruder, and short carbon fiber reinforced plastic composite B is extruded at a extrusion temperature of 200° C. and a crew speed of 50 rpm.

(3) The short composite B is granulated by granulator to obtain composite particles C.

(4) The composite particles C is then injected into electrofusion fitting according to the conventional electrofusion fitting injection process. The temperatures of the injection molding machine are set as 180° C., 185° C., 190° C., 195° C. and 200° C. for the 1~4 section and the outlet. The injection molding pressure is set as 80 bar. After the semi-finished electrofusion fitting is obtained, the copper foil electrodes are pasted on the surface of the fitting body with conductive silver glue.

For comparison, neat HDPE electrofusion fittings are manufactured with the same HDPE powder. The manufacturing process of neat HDPE electrofusion fitting in the embodiment is the same as the above steps, except that there is no electrode set on the fitting surface since neat HDPE material is not conductive.

The manufactured electrofusion fitting has an inside diameter of 110 mm and it is welded with two steel wire wrapped HDPE pipes, which are 60 mm in length and 110 mm in diameter. The welded fitting then went through hydraulic burst test. FIG. 10 displays pressure curve of the HDPE-CF and neat HDPE electrofusion fittings during burst tests. The blasting pressure is summarized in Table 1.

TABLE 1

Comparison of burst pressure of neat HDPE and 15 wt % HDPE-CF EF fitting.

|  | Blasting pressure/MPa | Average/MPa |
|---|---|---|
| Neat HDPE 1 | 5.79 | 5.80 |
| Neat HDPE 2 | 5.80 |  |
| HDPE-CF 1 | 8.10 | 8.11 |
| HDPE-CF 2 | 8.12 |  |

The average bursting pressure for neat HDPE fitting is 5.8 MPa. With the reinforcement of CF, the average bursting pressure of HDPE-CF fitting increases to 8.11 MPa, corresponding to an improvement of 41.8%. The results show that the addition of CF can significantly improve the mechanical strength and pressure bearing capability of electrofusion fitting.

Embodiment of self-monitoring of strain for electrofusion fittings:

The filled CF can improve the electrical conductivity of the HDPE-CF composite. The resistance of the composite can be measured by arranging electrodes on the surface of the electrofusion fitting. For composite with CF fraction near the critical threshold value, it exhibits the most significant resistance change responding to strain. Therefore, the weight fraction of filled CF in this embodiment is controlled around 5~20%.

For fitting used in plastic pipelines, the internal pressure will cause the deformation of fitting material, and result in the loss of CF contact. This will decrease the conductivity of the composite and increase the resistance between the electrodes. Based on such principle, we can monitor the strain and internal pressure of the fitting. This self-monitoring method of strain can monitor the strain at any desired position only by arranging two electrodes on the surface of the electrofusion fitting, without additional sensors or equipment. It can realize self-monitoring of strain for the electrofusion fitting in operation and improve the safety of the electrofusion fitting.

As shown in FIG. 2, the pair of electrodes 2 is set circumferentially along the electrofusion fitting, and the two electrodes are symmetrically distributed with respect to the axial center plane of the fitting. In order to reduce the contact resistance between the electrodes 2 and the surface of the electrofusion fitting, the electrodes are set with the following steps:

I: The surface where electrodes 2 are to be set is polished off with sandpaper;

II: A layer of silver glue is coated on the polished surface;

III: Electrodes 2 with a thickness of 0.1~0.5 mm are set on the polished surface with the silver glue.

Strain monitoring of the fitting under cyclic internal pressure loading is conducted first. FIG. 11 reveals the internal pressure and resistance change curves of the fitting under cyclic internal pressure loading. The pressure peak in the cyclic constant pressure loading is set as 5 MPa, and the maximum relative resistance change is 166%. In each cycle, the monitored resistance value rises rapidly as the internal pressure increases. This is due to the deformation of the fitting under internal pressure, and the decrease of the composite conductivity since the loss of CF contact. During the pressure holding stage, the fitting and pipe continue to slowly deform under internal pressure, resulting a gradual decrease of internal pressure. The slow deformation of the fitting will continue to increase the spacing between fibers in CF networks and reduce the chance of fiber contact, thus a slow rise in resistance is observed during pressure holding stage. For the whole cycle, the fitting is in the stage of elastic deformation. After pressure relief, the deformation of fitting and the contact between CF can return to the initial state, as well as the resistance. We can see that the electrical resistance values follow closely the internal pressure trend of fitting, and the peak resistance in each cycle is quite stable.

The method is also applied for strain monitoring of electrofusion fitting in burst test. FIG. 12 exhibits the relative resistance change and internal pressure of the electrofusion fitting verse time during the burst test. FIG. 13 shows the relative resistance change curve with internal pressure of the HDPE-CF electrofusion fitting in the burst test. It displays that with the internal pressure rising, the resistance between the two electrodes increases continuously. Also, the slope of resistance curve indicates that the resistance change rate rises rapidly. The slope starts to grow after 2.85 MPa, and it is much higher at the final stage compared to the slope at initial stage. It is because at the initial stage of pressurization, the change of resistance is mainly caused by the elastic deformation of the matrix and micro-cracks in interior materials. Preliminary damage affected the conductive contact points between CF. In this case, the conductive network inside the material is still connected, and consequently the resistance does not produce a particularly large change. While the pressure continues to increase, the CF gradually disconnect with each other, leading to a damage of the percolation networks in the composite, and a significant increase in the slope of resistance curve. Thus, this relationship between electrical resistance and material strain can be used to monitor inner pressure and the strain of electrofusion fitting, and can be possibly used for structural health monitoring of electrofusion fittings used in critical applications.

Based on the measured resistance, we can calculate the internal pressure of electrofusion fitting. Take the strain monitoring results of the above bursting test for example. The relative resistance change curve in FIG. 13 are divided into three stages, and are fitted respectively. The relationship between relative resistance change and internal pressure is obtained as follows $$\frac{\Delta R}{R_0} = 69.25P, 0 \le P \le 2.85 \quad (2)$$

$$\frac{\Delta R}{R_0} = 4.18 \times 10^{-11} P^{27.06}, 2.85 < P \le 3.51$$

$$\frac{\Delta R}{R_0} = 185097.91P - 625856.51, P > 3.51$$

The slope of resistance change curve at low pressure stage is 69.25, while the slope at high pressure is 185097.91, showing a significant increase. This result indicates that the reasons for resistance increase at low and high pressure stages are different. The resistance increase at low pressure stage is induced by increase of distance between CF in the conductive network. In this case, the conductive network inside the material is still connected, and consequently the resistance does not produce a particularly large increase. While at high pressure stage, the CF gradually disconnect with each other, leading to a damage of the percolation networks in the composite, which indicates the occurrence of irreversible damage inside the electrofusion fitting. Thus, the slope of resistance increases significantly. According to the slope change of the resistance curve, the critical irreversible failure pressure of the pipe under internal pressure can be determined to be 2.85 MPa, and the corresponding relative resistance change is 197.36%.

The safety assessment of electrofusion fitting can be determined by measuring the resistance change. In the above example, it indicates that irreversible damage happens when the relative resistance change exceeds 197.36%, and it is necessary to repair or replace the electrofusion fitting. Also, we can calculate the internal pressure from the measured resistance according to equation (2):

$$P = \frac{\Delta R}{R_0}/69.25, 0 \le \frac{\Delta R}{R_0} \le 197.36 \quad (3)$$

$$P = \left(\frac{\Delta R}{R_0} + 10^{11}/4.18\right)^{\frac{1}{27.06}}, 197.36 < \frac{\Delta R}{R_0} \le 23833.44$$

$$P = \left(\frac{\Delta R}{R_0} + 625856.51\right)/185097.91, \frac{\Delta R}{R_0} > 23833.44$$

The method does not require additional sensors or equipment, and the internal pressure and safety state of the pipeline can be obtained in real time only by measuring the resistance change of the electrofusion fitting. The self-monitoring method of strain can identify the potential failure risk in the electrofusion fittings, and preventive solution can be taken in time. This invention realizes the mechanical reinforcement of electrofusion fittings, as well as improving the safety of the electrofusion fittings.

What is claimed is:

1. A carbon fiber reinforced plastic electrofusion fitting with self-monitoring function of strain, the electrofusion fitting comprising an electrofusion fitting body embedded with a resistance heating wire, two terminals being arranged on the electrofusion fitting body and connected to the two ends of the resistance heating wire respectively, the electrofusion fitting body being made of a thermoplastic filled with short carbon fiber to improve an electrical conductivity of an electrofusion fitting body material, a conductive silver glue layer on a surface of the electrofusion fitting body to reduce a contact resistance between electrodes and the electrofusion fitting body, and at least one pair of electrodes being set on the conductive silver glue layer for monitoring a resistance change of the electrofusion fitting body material, the resistance change of the electrofusion fitting body material is caused by electrofusion fitting deformation due to temperature change or mechanical loading during operation, to achieve the self-monitoring of strain for the electrofusion fitting, wherein the electrodes are set between the resistance heating wire, the electrodes being set circumferentially along the electrofusion fitting to monitor an axial strain of the fitting, or being set along an axial direction of the electrofusion fitting to monitor a circumferential strain of the fitting; also, the electrodes being set at an angle of less than 45° to the circumferential or axial direction of the electrofusion fitting, to monitor the circumferential and axial strain of the fitting.

2. The carbon fiber reinforced plastic electrofusion fitting according to claim 1, wherein a weight fraction of the short carbon fiber is 5~20% for a reinforced plastic of the electrofusion fitting body.

3. The carbon fiber reinforced plastic electrofusion fitting according to claim 1, wherein the electrodes are sheet electrodes, the sheet electrodes being 0.1~0.5 mm in thickness and being set on the surface of the electrofusion fitting body by bonding.

4. The carbon fiber reinforced plastic electrofusion fitting according to claim 1, the fitting comprising at least one pair of electrodes, wherein the electrodes should not contact with each other.

5. The carbon fiber reinforced plastic electrofusion fitting according to claim 1, wherein a distance between the two electrodes in each pair is 1~5 mm.

6. A manufacturing method of the carbon fiber reinforced plastic electrofusion fitting according to claim 1, the method comprising the following steps:

(1) a thermoplastic powder and a short-cut carbon fiber are stirred with a mechanical stirrer, and a uniform mixture is obtained; the weight fraction of carbon fiber in the mixture is 5~20%; the carbon fiber has a diameter of 7~10 μm and a length of 1~5 mm; the thermoplastic powder refers to a polyethylene powder or a polypropylene powder;

(2) the thermoplastic powder and carbon fiber mixture is added into a hopper of an extruder, and the carbon fiber is evenly distributed in a plastic matrix by a screw shearing action of the extruder; short carbon fiber reinforced plastic composite is extruded, and then granulated by a granulator to obtain composite particles;

(3) a semi-finished electrofusion fitting is injection molded with the composite particles according to a conventional electrofusion fitting injection process;

(4) at least one pair of electrodes is set on a surface of the semi-finished electrofusion fitting: a layer of conductive silver glue is coated on the surface where electrodes are to be set, and then the electrodes are set on the conductive silver glue; or, electrode grooves are designed and manufactured on the surface of the semi-finished electrofusion fitting during injection molding;

finally, a carbon fiber reinforced plastic electrofusion fitting with self-monitoring function of strain is obtained.

7. The self-monitoring method of strain for the carbon fiber reinforced plastic electrofusion fitting according to claim 1, the method comprising connecting each pair of the electrodes to a resistance measurement system, measuring and recoding the resistance changes for strain monitoring when welding the electrofusion fitting or when the fitting is under loading.

8. A carbon fiber reinforced plastic electrofusion fitting with self-monitoring function of strain, the electrofusion fitting comprising an electrofusion fitting body embedded with a resistance heating wire, with two terminals being arranged on the electrofusion fitting body and connected to the two ends of the resistance heating wire respectively, wherein the electrofusion fitting body is made of a thermoplastic filled with short carbon fiber to improve an electrical conductivity of an electrofusion fitting body material; the carbon fiber has a diameter of 7~10 μm and a length of 1~5 mm and a weight fraction of the short carbon fiber being 12~15 wt % for a reinforced plastic of the electrofusion fitting body to improve gauge factor while enhancing mechanical enhancement, a conductive silver glue layer on a surface of the electrofusion fitting body to reduce a contact resistance between electrodes and the electrofusion fitting body, and at least one pair of electrodes being set on a surface of the electrofusion fitting body for monitoring a resistance change of the electrofusion fitting body material, wherein the electrodes are set between the resistance heating wire, the electrodes being set circumferentially along the electrofusion fitting to monitor an axial strain of the fitting, or being set along an axial direction of the electrofusion fitting to monitor a circumferential strain of the fitting; also, the electrodes being set at an angle of less than 45° to the circumferential or axial direction of the electrofusion fitting, to monitor the circumferential and axial strain of the fitting.

9. The self-monitoring method of strain for the carbon fiber reinforced plastic electrofusion fitting according to claim 8, the method comprising the following steps:

(1) at least one pair of electrodes are set on the surface of the electrofusion fitting body:

the surface where the electrodes are to be set is polished off with sandpaper, and a layer of silver glue is coated on the polished surface; electrodes with a thickness of 0.1~0.5 mm are set on the surface with the silver glue to reduce contact resistance; or, electrode grooves are designed and manufactured on the surface of the electrofusion fitting during injection molding;

(2) connecting each pair of electrodes to a resistance measurement system, measuring and recording the resistance changes for strain monitoring when welding the electrofusion fitting or when the fitting is under loading.

\* \* \* \* \*